Figure 2:
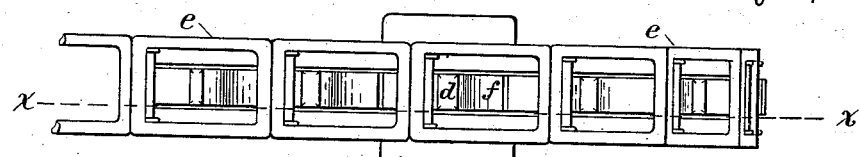

(No Model.)

W. D. EWART.
SPROCKET WHEEL.

No. 382,079.          Patented May 1, 1888.

WITNESSES:
A. M. Williamson
A. Birkett.

INVENTOR
W. D. Ewart.
BY
J. N. McIntire.
ATTORNEY

UNITED STATES PATENT OFFICE.

WILLIAM D. EWART, OF CHICAGO, ILLINOIS, ASSIGNOR TO THE EWART MANUFACTURING COMPANY, OF SAME PLACE.

SPROCKET-WHEEL.

SPECIFICATION forming part of Letters Patent No. 382,079, dated May 1, 1888.

Application filed December 9, 1887. Serial No. 257,410. (No model.)

*To all whom it may concern:*

Be it known that I, WILLIAM D. EWART, of Chicago, in the county of Cook and State of Illinois, have invented a new and useful Improvement in Universal Sprocket-Wheels or Chain-Wheels; and I do hereby declare that the following is a full, clear, and exact description thereof, reference being had to the accompanying drawings, making part of this specification.

My invention relates to what are familiarly known in the art as "sprocket-wheels"—that is, toothed wheels adapted to work or run in engagement with rag-chains or chain belts.

As is well understood by those skilled in the art to which my invention relates, the principle of construction and mode of operation involved in that kind of contrivance for transmitting motion and power that comprises the use of a chain belt or link belt and sprocket-wheels, while theoretically bearing a strong resemblance to the construction and action of a system of gears for a similar purpose, are in practice radically different, in that while in a gear system the teeth of the wheels which mass together have the same pitch the pitch of the teeth or sprockets of chain-wheels is necessarily always different from that of the teeth-engaging parts of the chain or link belt. Again, while theoretically the principle of operation of a chain belt and sprocket-wheel is similar to that of a belt and pulley engaging each other by frictional superficial contact only, in practice it is diametrically different, in that in the one case the belt and the pulley are in operative frictional engagement through those portions of the belt and of the wheel's periphery that are in contact, while in the other case the sprocket-wheel and chain belt are always in operative engagement (for the purpose of the transmission of motion and power) at only a single point—*i. e.*, at the locality only where a single tooth or sprocket of the wheel is in perfect operative contact or bearing with one bearing-surface of or point in the chain. Furthermore, a motion-and-power transmitter composed of a chain belt and sprocket-wheels, while apparently resembling a gear system in the particularity of a similarity in the pitch of the teeth of all the wheels, is radically different, in that the pitch of the teeth of the driving-wheel must always be different from that of a driven wheel, the relationship of the pitch of these wheels being such that the pitch of a driving-wheel is greater and that of a driven wheel less than the pitch of the chain adapted to work in engagement with both kinds of wheels. From these known peculiarities of a motion-and-power transmitter comprising a chain belt and sprocket-wheels the following results, with their attendant disadvantages, are of course inevitable:

First. Each of the wheels with which the belt engages must always receive and bear the entire draft-strain on some one single tooth, whereas if this strain could be at all times divided between two or more of the teeth the advantage would be gained of rendering the wheel capable of doing the same work with teeth of less size and structural strength.

Second. Since the pitch of the driving and driven wheels must each vary in a different and specified manner relatively to the chain belt, a great disadvantage is encountered in the inability of this sort of motion-and-power transmitter to operate in both ways, since a driving-wheel will not work as a driven wheel, and vice versa.

Third. In the co-operative action of the chain belt with both driving and driven wheels the mode of operation is necessarily such that as the single tooth of either a driving or a driven wheel that is in forcible engagement with one of the bearing-surfaces of the chain runs out of engagement it must do so and the next one must come into engagement with both a concussive and abrasive movement relatively to the next bearing-surface of the chain, that is very damaging to both the wheel and the chain on account of both the frictional wear on the contacting or bearing surfaces of chain and wheel and the sudden shock or strain to which both the belt and the wheels are subjected.

I propose by my invention to provide for use a chain belt and sprocket-wheel motion-and-power transmitter in which both the driving and the driven wheel (or wheels) shall be capable of a distribution of the strain imparted to or received from the belt on two or more of the teeth, thereby avoiding all the disadvantages due to having the whole draft-strain borne always by some single tooth of the wheel, and in which, also, the mechanism shall be capable of operation with equal efficiency and facility with any wheel acting either as a driver or a driven wheel, shall coact with the bearing or wheel-engaging surfaces of the chain in such manner as to avoid all abrading and all concussive action between the contacting surfaces of chain belt and wheel, and consequently in such manner as to greatly conduce to both the efficiency and the durability of the mechanism or contrivance.

To these main ends and objects my invention may be said to consist, essentially, in a sprocket-wheel (for use in connection with any suitable chain belt) having its teeth movable in such a manner that the pitch of the teeth will automatically conform perfectly to that of the chain as the latter comes into, remains in, and runs out of engagement with the wheel, all as will be hereinafter more fully explained, and as will be more particularly pointed out in the claim of this specification.

To enable those skilled in the art to which my invention relates to understand and practice the same, I will now proceed to describe it more fully, referring by letters to the accompanying drawings, which form part of this specification, and in which I have shown said invention carried out in that form in which I have so far successfully practiced it, although it may be used under various modifications, of course, and with somewhat different details of construction from what I have shown in said drawings.

Figure 1:
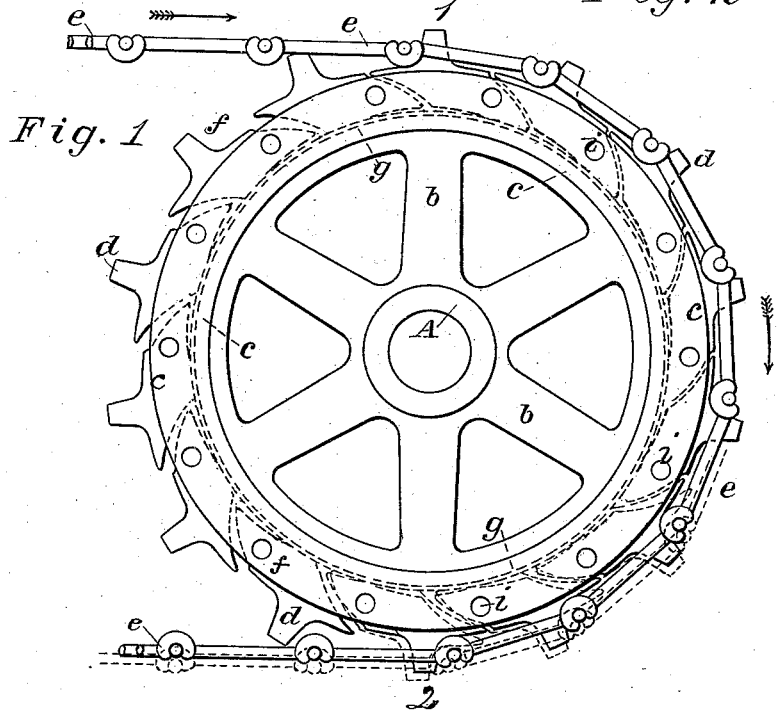
Figure 3:
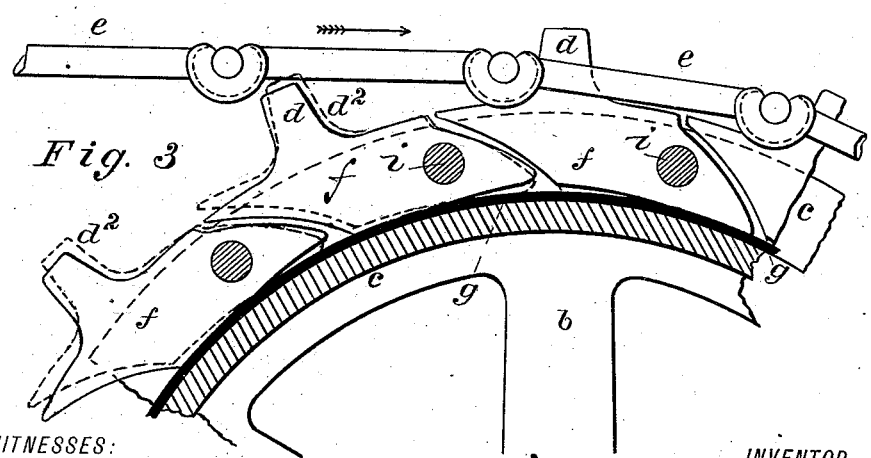

In the drawings, Figure 1 is a side view or elevation of a sprocket-wheel embracing my invention and shown in connection with part of an endless link belt or drive-chain. Fig. 2 is a top view of the devices seen in elevation at Fig. 1; and Fig. 3 is a partial vertical section at the line $x\,x$ of Fig. 2, drawn on an enlarged scale for the purpose of better showing the structure of the wheel and illustrating the actions of its movable parts.

In the several figures the same parts will be found always designated by the same letters of reference.

The sprocket-wheel shown is preferably of that species which is composed of a rim connected by a series of radial arms, $b$, with a central hub, A, and in lieu of having its teeth or sprockets formed integrally with the cast-metal rim, it has its teeth made separately and mounted pivotally, as will be presently explained.

$e$ represents a part of an endless drive-chain or link belt, which in the case shown is of that species well-known in the market as the "Ewart detachable drive-chain."

The sprocket-wheel has its rim-like portion made with a deep peripheral groove, which is preferably about rectangular in cross section, and within this groove are mounted a series of dogs or blocks, $f$, the trunnions of which, $i$, are mounted at their ends in the flange-like portion $c$ of the rim of the wheel, all as clearly shown, and each one of these dogs or metallic block-like pieces $f$ is formed or provided with a toothed sprocket, $d$, which projects in a direction substantially radial of the wheel when the said sprockets are in their working or chain-engaging condition.

$g$ is a leather backing-band or annular cushion which covers the bottom of the periperal groove within which the dogs $f$ are mounted, and which serves, as will be hereinafter explained, the purpose simply of cushioning the heels or rear ends of said dogs whenever said portions may be forced toward and seated upon said leather or other band $g$.

The arrows at Figs. 1 and 3 indicate the proposed direction of motion of the wheel and its driving chain or belt, and in the case shown the link belt or chain is represented as driving the sprocket-wheel, which fact, of course, renders said wheel a driven one in contradistinction to what is shown as a driving-wheel. As will be presently explained, however, this condition of the parts may be transposed, so that the sprocket-wheel may be revolving in the opposite direction and act as a driver.

In the operation of a sprocket-wheel such as shown, and the link belt or drive-chain engaging therewith, as illustrated, the tendency of all of the dogs or pivoted parts $f$, that carry the sprockets $d$, is to assume such a position round about their pivotal connections with the rim of the wheel as to bring their heel portions or inner rearmost parts into contact with the cushion-like annulus $g$, and so that the sprockets will occupy positions relatively to the other part of the wheel, such as shown by the full lines with reference to the sprockets $d^2$ of Fig. 3, and as the wheel is rotated in the direction indicated by the arrow the sprockets $d^2$ come easily into perfect engagement at their working-faces with the bearing-surfaces of the chain $e$, so that said bearing-surfaces of the chain are perfectly and completely seated against the working-faces and root portion of these sprockets, successively, just before said sprockets arrive at the vicinity of the point at which the upper run of the chain extends tangentially away from the circumference of the sprocket-wheel, and as the pivoted dogs with their sprockets approach toward and arrive at this point the said dogs are moved (more or less) at their outer ends, so as to slightly lift their rearmost heel portions away from the cushion-like device $g$, the draft-strain of the chain on said sprockets being exerted from this point inwardly (throughout that portion of the wheel in which the chain and the periphery of the wheel continue to keep company) in the direction of the pivotal points $i$ of attachment of said dogs to the flange-like portions of the rim of the wheel. It will be understood that from about the point $l$ of Fig. 1 round to the point 2 all the sprockets $d$ of the wheel are in perfect working-contact with the bearing-surfaces of the chain or belt $e$, and that after passing beyond the point 2 these sprockets successively run out of working-contact with the bearing-surfaces of the chain, leaving said surfaces, however, only when, after having been moved by the latter to a position as far away as possible from the axial point of the wheel, they are obliged to part company with the chain, and from this fact it will be seen that a series of sprockets, $d$, are at the same time in operative contact with the bearing-surfaces of the drive-chain, and that thus the draft-strain is distributed along all the sprockets thus in working condition at the same time.

At the upper left-hand portion of Fig. 3 I have shown two of the dogs $f$, with their sprockets or teeth $d^2$, in two different positions—viz., that position which each of the said dogs assumes by the force of centrifugal power during the rotation of the wheel and that into which the dog and its teeth are forced by the draft-strain of the drive-chain as the latter comes into a working relationship to the sprocket. A correct explanation of the different positions assumed at different times by these pivoted dogs, each carrying a sprocket, may perhaps be properly made by stating that the normal condition of all those dogs which are out of engagement with the drive-chain is that which brings their sprockets $d$ to the most distant point from the center of the wheel, while the normal condition of all those dogs which are in active engagement with the drive-chain is that in which their sprockets are forced and held by the action of the chain at a point nearer to the center of the wheel, and it will be understood that from this condition of facts the movable sprockets render the sprocket-wheel capable of having a variable pitch to its teeth, the pitch being regulated or varied according to the position of the dogs $f$ on their pivotal connections and being forced to conform precisely to that of the drive-chain, whatever the latter may be.

Of course in any case in which the gravity of the dogs $f$ and the position of the sprocket-wheel, and the slowness of its feed, may be such as to render it necessary some device—such as a spring, for instance—may be employed in connection with each one of the dogs for the purpose of forcing it into that necessary position which I have just above explained as being the normal one of all the dogs which are not in operative engagement with the drive-chain.

Whenever from any cause—as, for instance, wear of the parts—the pitch of the chain may become slightly increased, the extent to which the dog-like devices $f$ will be forced at their sprocket or tooth portions toward the center of the wheel will be less, of course, than in the case shown, the sprockets in active engagement with the chain and the dogs thereof being then forced and held in a changed position, as illustrated, for instance, by the dotted lines at the bottom and lower right-hand portion of Fig. 1. In other words, any variation in the pitch of the chain will be compensated for by the enforcement of the dogs and their sprockets into such a different position that the pitch of the sprocket-wheel will still conform perfectly to that of the drive-chain. Thus under all circumstances or conditions of wear will a perfect fit or bearing between the chain and those sprockets of the wheel which are at any given time in working engagement with said chain be maintained, and this is equally true of the contrivance shown, no matter whether the wheel illustrated be acting as a driver or be used as a driven wheel, since in either case the draft-strain on the working sides of the sprockets tends to produce the effect or condition of affairs just above explained.

In the operation of a sprocket-wheel thus constructed with automatically-movable sprockets not only are the effects and advantages above alluded to gained, but all concussive and abrading action between the working-faces of the sprockets and the bearing-surfaces of the chain that tend to wear away both these parts is wholly avoided, and the contacting-surfaces, both at the localities where the chain runs onto the wheel and also runs off of the wheel, come into and pass out of co-operative action with practically little or no frictional wear to the parts. This peculiarity of operation constitutes one of the most important features of my invention, and of course this desideratum may be accomplished in a wheel constructed upon my novel principle, but in which the movable teeth or sprockets may move in a somewhat different manner from that shown and described, and may have their changes of position effected by somewhat different means from that which I have explained.

I have deemed the simple pivotal connection of each dog $f$ with the rim of the wheel as the preferable mode of construction for the purpose of attaining the automatic movableness of the sprockets of the wheel; but in lieu thereof some other plan may be adopted, of course, by which the same general effects due to the capacity of the sprockets to move outwardly from the rim of the wheel as they pass into and out of engagement with the chain, and to be forced into such position as to render the pitch of the teeth exactly correspondent to the pitch of the chain throughout that portion of the wheel's periphery which is banded by the chain, will be attained.

Having now so fully explained my novel construction of sprocket-wheel that those skilled in the art can understand and practice my invention, either in the precise form of wheel shown or under some modified construction, and wishing it to be understood that the pith of my improvement rests in the mobility, so to speak, of the sprockets in substantially the manner and for the purposes hereinbefore explained, what I claim as new, and desire to secure by Letters Patent, is—

5. A sprocket-wheel having bodily-movable teeth or sprockets, the movements of which vary the pitch of the wheel, substantially as and for the purposes set forth.

In witness whereof I have hereunto set my hand this 3d day of December, 1887.

WILLIAM D. EWART.

In presence of—
  A. M. WILLIAMSON,
  C. FINKELMEIER.